(12) United States Patent
Luo et al.

(10) Patent No.: US 10,140,353 B2
(45) Date of Patent: Nov. 27, 2018

(54) TECHNIQUES FOR QUERY PROCESSING USING HIGH DIMENSION HISTOGRAMS

(71) Applicant: Teradata US, Inc., Dayton, OH (US)

(72) Inventors: Congnan Luo, San Diego, CA (US);
Heng Yuan, San Diego, CA (US);
Daniel Wong, San Diego, CA (US);
Guilian Wang, San Diego, CA (US)

(73) Assignee: Teredata, US, Inc., Dayton, OH (US)

( * ) Notice: Subject to any disclaimer, the term of this patent is extended or adjusted under 35 U.S.C. 154(b) by 536 days.

(21) Appl. No.: 14/579,684

(22) Filed: Dec. 22, 2014

(65) Prior Publication Data

US 2015/0220617 A1 Aug. 6, 2015

Related U.S. Application Data

(60) Provisional application No. 61/920,009, filed on Dec. 23, 2013.

(51) Int. Cl.
*G06F 17/30* (2006.01)

(52) U.S. Cl.
CPC .. *G06F 17/30598* (2013.01); *G06F 17/30339* (2013.01); *G06F 17/30498* (2013.01)

(58) Field of Classification Search
USPC ................................................ 707/737, 802
See application file for complete search history.

(56) References Cited

U.S. PATENT DOCUMENTS

| | | | |
|---|---|---|---|
| 6,012,054 A | 1/2000 | Seputis | |
| 6,052,689 A | 4/2000 | Muthukrishnan et al. | |
| 6,263,345 B1 | 7/2001 | Farrar et al. | |
| 6,460,045 B1* | 10/2002 | Aboulnaga | ....... G06F 17/30469 |
| 6,477,523 B1 | 11/2002 | Chiang | |
| 7,889,923 B1* | 2/2011 | Carr | ......................... G06T 5/40 |
| | | | 382/168 |
| 2002/0198896 A1* | 12/2002 | Chaudhuri | ........ G06F 17/30463 |
| 2008/0298680 A1* | 12/2008 | Miller | ..................... G06T 5/008 |
| | | | 382/168 |
| 2012/0254199 A1* | 10/2012 | Kuno | ........................ G06F 7/32 |
| | | | 707/752 |
| 2013/0229867 A1* | 9/2013 | Tang | ..................... G11C 16/26 |
| | | | 365/185.2 |
| 2014/0201129 A1 | 7/2014 | Gupta | |
| 2014/0282160 A1* | 9/2014 | Zarpas | ............. G06F 17/30991 |
| | | | 715/769 |

* cited by examiner

*Primary Examiner* — Cam Linh T Nguyen
(74) *Attorney, Agent, or Firm* — Schwegman, Lundberg & Woessner, P.A

(57) ABSTRACT

Relational data for a database table having multiple columns (dimensions) is represented as a histogram. The buckets of the histogram are clustered into clusters, the clusters are fewer in number than the buckets of the histogram. Each cluster is represented in hyper-space as a line segment (vector) with a thickness value. Average frequencies for the line segments (vectors) and their thickness values are computed. The average frequencies are processed by a query optimizer when processing a query predicate of a query to use as an estimation of selectivity or an estimation of a cardinality of a join operation.

20 Claims, 6 Drawing Sheets

TECHNIQUES FOR QUERY PROCESSING USING HIGH DIMENSION HISTOGRAMS

RELATED APPLICATIONS

The present application is co-pending with, claims priority to, and is a non-provisional application of Provisional Application No. 61/920,009 entitled: "Techniques for High Dimension Histograms," filed on Dec. 23, 2013; the disclosure of which is hereby incorporated by reference in its entirety herein and below.

BACKGROUND

In relational databases, a histogram provides very important data distribution statistics for query optimizers to estimate the selectivity of a query predicate or the cardinality of a join. The selectivity is an indication as to whether a portion of the query is more efficiently processed by using an index or more efficiently found by iteratively scanning rows of the database. The higher the selectivity the better it is for the query optimizer to use the index to find a portion of a query while the lower the selectivity the better it is for the query optimizer to scan rows of the database iteratively to find a portion of the query. The data distribution provided by a histogram provides a mechanism for the query optimizer to estimate selectivity or cardinality of a join based on each histogram data bucket.

However, traditional techniques use a low-dimension histogram approach that usually does not work well for high-dimensional databases. For example, a traditional histogram built for 5-dimensions of data (e.g. 5 columns in a table) where each dimension has 128 buckets or $2^7 * 2^7 * 2^7 * 2^7 * 2^7 = 32$ GB buckets requiring 128 GB (gigabytes) of memory and/or storage. Even though some compression techniques can alleviate this memory/storage utilization problem, the overall space and computation costs required for processing a query at run time is still often unacceptable for even the most advanced database systems. Moreover, very few database tables are limited to just 5 columns; more likely, an average commercial database may approach 10's and even, in some situations, 100's of columns (dimensions). So, the issue of memory, storage, and processing efficiency is grossly understated by the example presented and is orders of magnitude larger in the average database deployment scenario associated with the industry.

In fact, in both the academia literature and the industrial literature there are very few, if any, stated research projects or stated industry practices that address how to handle query optimization using high-dimension histograms due to the technical obstacles that such an approach presents.

Therefore, there is a need to provide the benefits of selectivity and cardinality estimation for query optimizers when processing queries that can use high dimension histograms without the technical problems that have heretofore been unsolved or purposefully avoided due to the perceived complexity of the issue.

SUMMARY

In various embodiments, techniques for query processing using high dimension histograms are presented. According to an embodiment, a method for representing high dimension data for query processing is provided.

Specifically, a histogram is generated for data of a multi-dimensional relational data table. Next, buckets of the histogram are aggregated into a fewer number of clusters. Each cluster is presented as a vector in hyper-space and an average data frequency for each vector is resolved.

DETAILED DESCRIPTION

Figure 1:
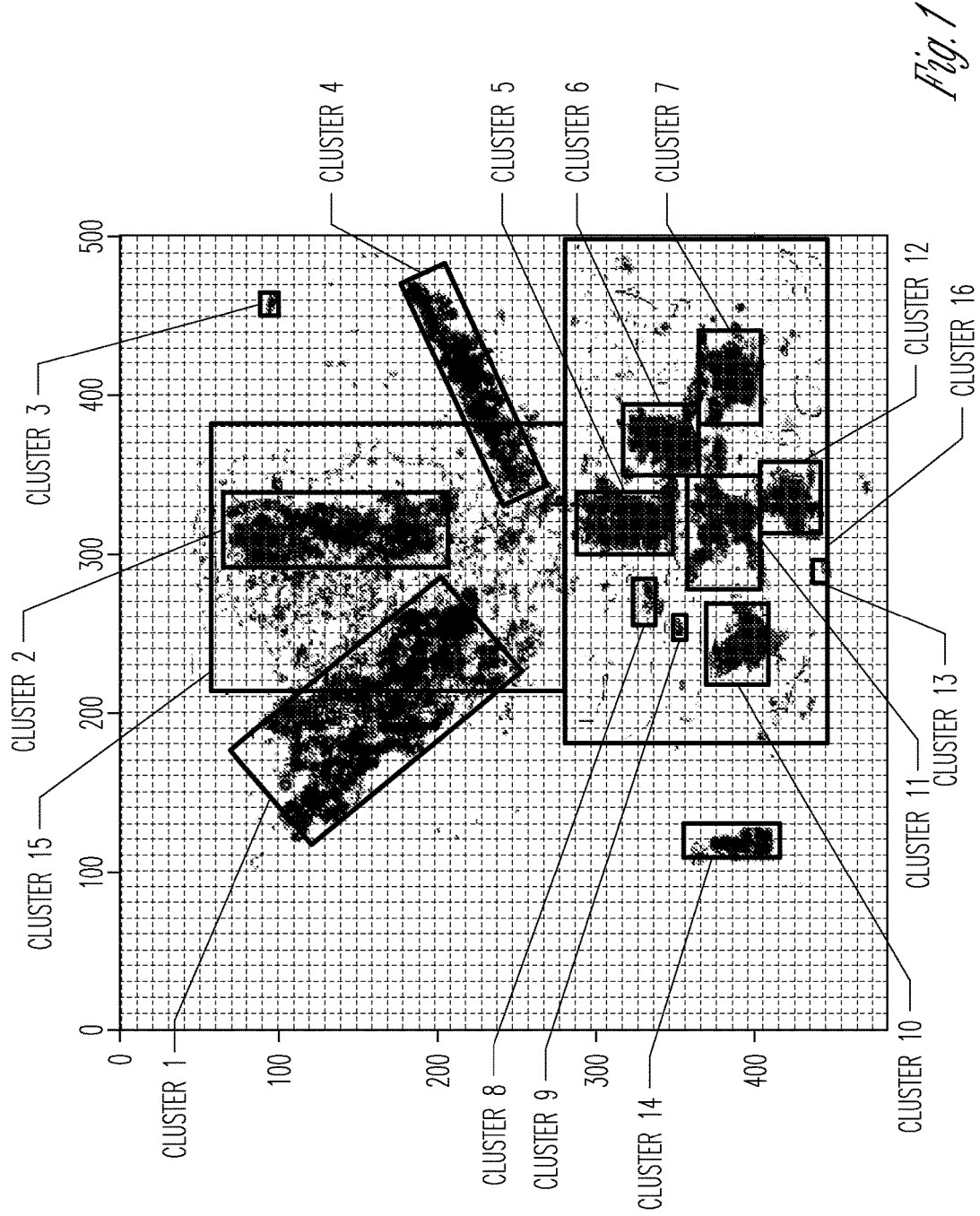
FIG. 1 is a diagram of a sample histogram for data distribution of a sample 2-D relational database table, according to an example embodiment.

It is to be noted that the techniques presented herein are implemented as executable instructions that are programmed in memory or non-transitory computer-readable storage media (or medium) for execution on one or more processing devices, each processing device having one or more processors, and each processor specifically configured to execute the executable instructions.

The techniques and system herein propose a new and novel approach for memory, storage, and processor efficient generation, representation, storage, and usage of high-dimension histograms for query processing.

The techniques are for high-dimension data. In many practices, the number of dimensions could be from $2^{10}$ and larger. In the description that follows, a 2-D (two-dimensional (two columns of data in a database table) example is used to illustrate each processing step of the approach for ease of comprehension. But, it is to be noted that the techniques presented herein can be applied to higher n-dimensional (n-columns of data in a database table) cases as well.

Initially, a traditional multi-dimension histogram is built. Then, clustering is performed on that initial histogram (clustering is not performed on the original data that was used to build the initial histogram), so that each resultant cluster contains a number of adjacent traditional histogram buckets that have relatively similar frequencies. Therefore, the very large traditional histogram is transformed to a new histogram with much fewer buckets, where each bucket is actually a cluster. Then, each cluster is processed so that it can be represented using a hyper-space line segment with a thickness value.

In the discussion that follows, it is demonstrated that this new representation is not only extremely compacted in memory/disk (storage) space but also has great advantage in terms of computation cost (processor efficiency) when it is used at the query optimizing time. The new histogram is called Clu-Histogram (Clustered Histogram). At runtime, if a query predicate falls in a Clu-Histogram bucket, then the average frequency associated with that cluster is used to estimate its selectivity. The estimated selectivity is used by the query optimizer to determine whether a database table index is more efficient to resolve a portion of the query results or whether scanning rows for the portion of the query results is more efficient.

Generation of the CLU-Histogram

Initially, some terms are defined for comprehension of the techniques and system that are presented herein. From a relational database perspective, a "dimension" corresponds to a column of a table. The "domain" of a dimension corresponds to the range of values in that column. All the dimensions of the table are referred to as "hyper-space." A traditional histogram divides the hyper-space into small hyper-cubes and each hyper-cube is referred to as a "bucket." Usually, the hyper-cube is a regular shape represented by a pair of (min, max) on each dimension. For example, in 2-D space, the hyper-cube is a rectangle represented as (Xmin, Xmax, Ymin, and Ymax). In 3-D (three-dimensional) space, the hyper-cube is a 3-D cube represented as (Xmin, Xmax, Ymin, Ymax, Zmin, and Zmax). The similar representation applies to higher n-dimension situations.

For illustration, a 2-D example is used to explain the process of generating a Clu-Histogram. In this example, a histogram is built for two columns (c1, c2) of a table t1. The 2-D histogram is shown as the FIG. 1. Suppose the domain (range in values) for each dimension is [0,500]. If the size of each bucket is set to 10*10, the 2-D histogram will consist of 50*50=2500 buckets. The database is scanned once to accumulate the frequency of each bucket. If a row with (c1, c2) value falls into a bucket, its frequency is increased by 1. Finally, each bucket can be represented as (i, j, freq), where i and j are the index to a bucket and "freq" (frequency) is the number of the rows falling in that bucket. As an example, if 100 rows in the table having value (c1=252, c2=345), then the $25^{th}$ bucket at the $34^{th}$ line in the histogram is represented as (25, 34, 100).

The generation of the high-dimension Clu-Histogram is performed on the initial constructed histogram and it includes two primary phases: a clustering phase and a representation phase.

Clustering Phase

A clustering algorithm is applied to the high-dimension histogram {(i, j, freq)|0<=i<50, 0<=j<50} in the 2-D (two dimensional) example. This helps find a group of clusters where each cluster includes a number of adjacent histogram buckets that share the most similar frequency.

In the example, presented in the FIG. 1: cluster 1, 2, 3 . . . 14 includes those strongest clusters with relatively high frequency in the histogram. For the rest of the clusters, depending on how many buckets are allowed, many of them are merged into a bigger cluster. For example, cluster 15 and cluster 16 are formed using some smaller clusters that are not as strong as cluster 1 to 14. So, the final result is a total 17 clusters, i.e. 17 buckets in the newly generated Clu-Histogram. The clusters 1 to 14 are those in the smaller rectangles of the FIG. 1 having the highest frequencies, cluster 15 and 16 are the two larger rectangles with relatively lower frequencies, and the last cluster is for the whole hyper-space with a default frequency. At runtime, if the predicate falls in a bucket that doesn't belong to cluster 1 to 14, then a check is made to see if it belongs to cluster 15 or 16. If this is still not the case, it is consider as a candidate for cluster 17. These clusters are sorted in this order for checking at runtime.

Figure 2:
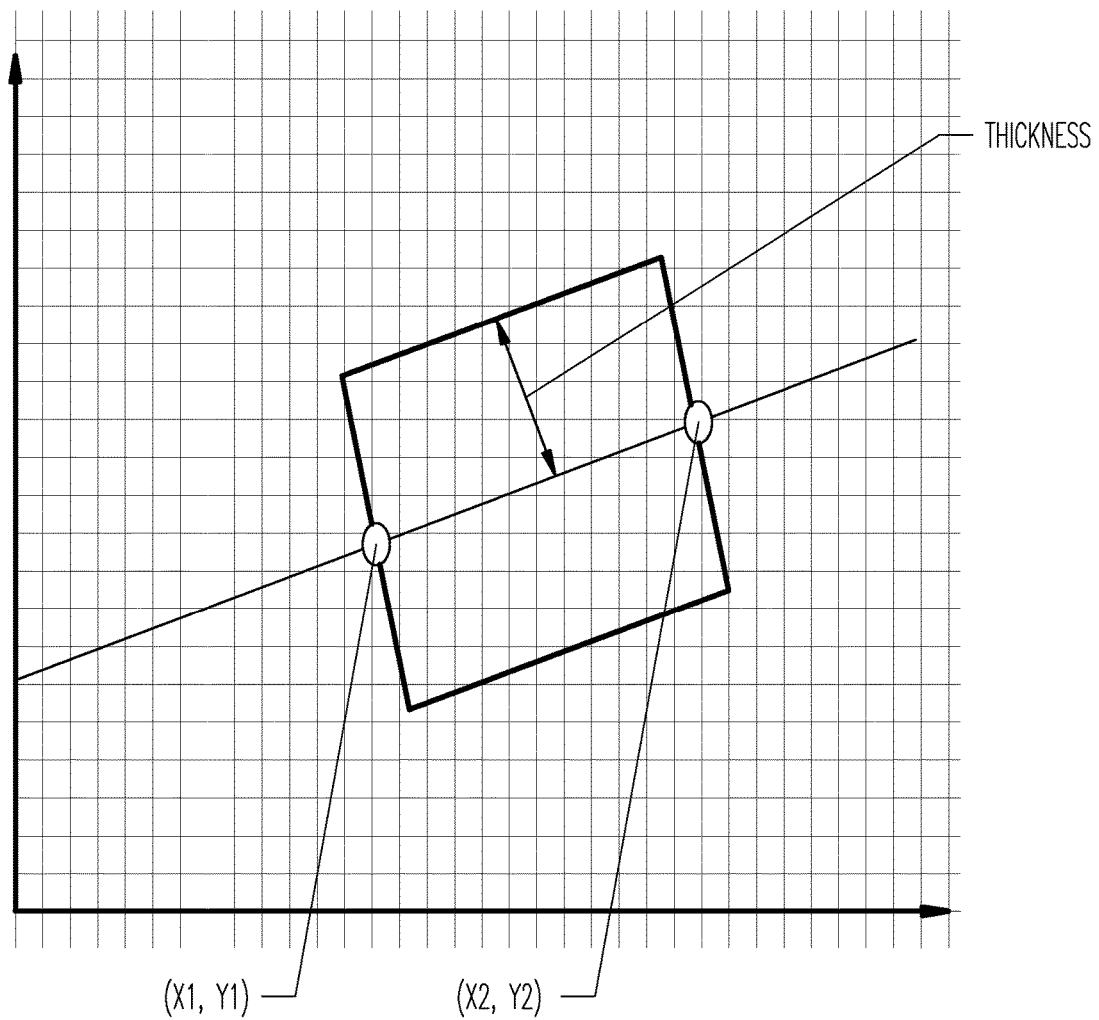
FIG. 2 is a diagram of a new histogram representation, according to an example embodiment.

The clustering algorithm not only outputs the number of clusters, but also marks each initial histogram bucket's membership to one of the clusters. So the next thing to process, given all the buckets of a cluster, is representing the cluster. In the 2-D case shown in FIG. 1, each cluster is enclosed in a rectangle that is as small as possible but still covers most buckets belonging to it. In an n-D (n-dimensional) space, the cluster is expected to be enclosed in a hyper-cube. Please notice the challenge here is to find that rectangle and some rectangle, like cluster 1 or cluster 4, which might have an angle against the standard Euclidean coordinate system. In the techniques herein, a hyper-space line segment and a thickness value to approximately represent the hyper-cube are found to represent the cluster. The FIG. 2 shows an approach for the 2-D example, where the line segment and the thickness of that line segment show where the cluster is in the 2-D space and how big (large) it is. This approach applies to n-D space too. In the next section it is detailed how to find the hyper-space line segment and its thickness.

In the FIG. 2 (2-D example), instead of using 2500 buckets to store the histogram, only 17 buckets are used in the Clu-Histogram. This significantly reduces the memory/space required for the new representation of a high-dimension histogram (CLU-Histogram) from a traditional histogram approach.

It is to be noted that most advanced clustering algorithms work for both low-dimension and high-dimension data. In high-dimension cases, each bucket in a traditional multi-dimensional histogram can be represented as (a_1, a_2, a_3 . . . a_n, where a_i is the index to the bucket at the $i^{th}$ dimension in the traditional histogram. Then, all the rest of the clustering process is similar to the 2-D case.

Representation Phase

The above clustering phase outputs each cluster with all the buckets belonging to it in a traditional histogram representation. Next, the hyper-space line segment and a thickness value to represent a cluster are determined. This can be achieved in the following two processing steps: a linear regression step and a thickness computational step.

Linear Regression Step

For a given cluster C, and using all the buckets belonging to it, i.e. {(a_1, a_2, . . . a_n, cluster_id)|cluster_id=C} as the input, a linear regression algorithm is processed to find the hyper-space line that runs through the middle of the cluster. For n-dimensional space, the linear model for the regression algorithm is:

$$\beta_1 X_1 + \beta_2 X_2 + \beta_3 X_3 + \ldots + \beta_n X_n + \alpha = 0.$$

This is actually the function of a hyper-space line. The regression technique helps find the optimal parameters $\beta_1$, $\beta_2 \ldots \beta_n$ and $\alpha$, so that the line best fits with the data. In another words, this line is in the middle of the cluster. In the 2-D example case (the FIG. 2), the data set is {(a_1, a_2, cluster_id)|cluster_id=C} and the 2-D linear model is:

$$\beta_1 X_1 + \beta_2 X_2 + \alpha = 0.$$

The result is a line that is a good approximate of the line segment shown in FIG. 2. The line segment of the FIG. 2 is referred to as a Cluster Center Line (CCL).

Thickness Computation Step

With the line segment, which usually perfectly runs through the center of the cluster, the associated thickness and the two end points are found that make the line segment out of the line. Combining the line segment and the thickness value, indicates where the cluster is and how big (large) it is in the hyper-space.

To understand how to find the line segment and the thickness, mathematical operations are processed as detailed below.

Figure 3:
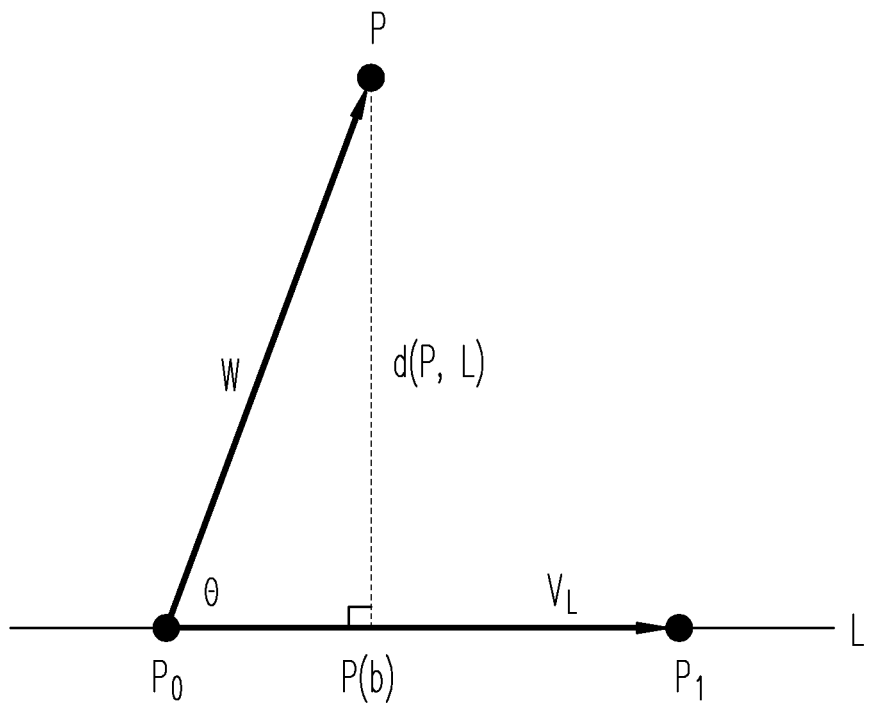
FIG. 3 is a diagram graphically depicting distance resolution for a new histogram representation, according to an example embodiment.

In the FIG. 3, a standard n-dimensional coordinate system is depicted where: a line is a vector. To compute the distance d(P,L) from an arbitrary point P to a line L ($P_1$–$P_0$), suppose P(b) is the base of the perpendicular dropped from P to L. With $v_L$=($P_1$–$P_0$) and w=(P–$P_0$), such that:

$$b = \frac{d(P_0, P(b))}{d(P_0, P_1)} = \frac{|w|\cos\theta}{|v_L|} = \frac{w \cdot v_L}{|v_L|^2} = \frac{w \cdot v_L}{v_L \cdot v_L}$$

thus, $$d(P, L) = |P - P(b)| = |w - bv_L| = |w - (w \cdot u_L) - u_L|$$

where $u_L$ is the unit direction vector of L.

Again, the mathematical calculation illustrates a solid mathematic basis. Next, a 2-D computation formula is derived from the mathematical calculations. The distance from a point P (x, y) to a line f(x, y) =ax+by+c in a 2-D space is:

$$d = \frac{ax + by + c}{\sqrt{a^2 + b^2}}$$

With the above information now known, the distance from any point to any line in the n-dimensional hyper-space is computed.

Referring to the thickness processing step, the thickness is found from the distances and from the buckets of a cluster to its CCL. Each bucket is iterated in a cluster, computing its distance to the CCL of that cluster. The maximal distance is considered as the maximum thickness needed for the cluster. In an embodiment, the maximum thickness can be reduced to some smaller value as long as it still covers a substantial, like 90%, of the buckets in that cluster. In an embodiment, a fading ratio is specified with the cluster too; and, usually at runtime, without the fading ratio, when a traditional bucket is involved in a query, a particular cluster it belongs to is found, and then the average frequency of that cluster is used to estimate the frequency of the bucket no matter how far it is from the CCL of the cluster. But with the fading ratio, the average frequency can be decreased depending on its distance to the CCL; the further, the more the average frequency fades. This gives a better estimation of the frequency for that bucket.

To determine the final line segment, the perpendicular line P(b) of each bucket is computed, as shown in FIG. 3. For the 2-D example, the formulas to get the intersection point P(x', y') of the perpendicular line from point P(x, y) to CCL ax+by+c=0 is:

$$x' = x - \frac{d \times a}{\sqrt{b^2 + a^2}}$$

$$y' = y - \frac{d \times b}{\sqrt{b^2 + a^2}}$$

where d is the distance between P(x, y) and the CCL.

Next, the two end points from the intersection points of all buckets are found in the cluster. For the 2-D example, the end points (x1, y1) and (x2, y2) are found, as shown in FIG. 2, which have the minimal and maximal values in the two dimensions, respectively.

New Bucket Representation for Storing Clu-Histogram

Once the line segment and the thickness have been resolved for a cluster, the cluster will be represented by using:
1) the CCL parameters $\beta_1$, $\beta_2$ ... $\beta_n$ and $\alpha$;
2) the two end points of the CCL;
3) a thickness value d;
4) an average frequency of the cluster; and
5) an optional fading ratio.

Compared with keeping a long list of buckets for each cluster, the presented novel representation for a cluster is extremely compacted. In addition, the usage of the Clu-Histogram during query optimizing time is much more efficient. To check if a traditional bucket involved in a query predicate falls in a cluster or not, sequentially searching the list of buckets of every cluster is not needed. Instead, its relative position to each cluster is computed to determine its membership as shown in the section Using CLU-Histogram (discussed below).

The novel representation can also be visualized easily. For example, in a 3-D case, the cluster is displayed as a tilt cylinder (the tilt line segment is the cylinder's axis and the thickness is its radius) in the 3-D space. This can be particular useful for interactive data visualization tools.

Using CLU-Histogram

At runtime, to optimize a query, if the query predicate involves the values (c_1, c_2, c_3 ... c_n) in multiple columns, it is determined where this value may be in the traditional histogram that the new Clu-Histogram is built from. By dividing the bucket size of each dimension in the traditional histogram, its indices are acquired to a bucket in the traditional n-dimension histogram, e.g. bucket (a_1, a_2, a_3, ... a_n). It is noted that only the bucket size of each dimension in the traditional histogram is needed. Moreover, the whole traditional histogram is not saved at all. Once the generation of Clu-Histogram is done, the original voluminous traditional histogram (large size) is discarded/removed/deleted.

Next, the index vector (a_1, a_2, a_3, ... a_n) is used to locate its presence in the new Clu-Histogram. Each bucket in the Clu-Histogram is iterated one by one, starting from the cluster, which was sorted at the beginning. The distance between (a_1, a_2, a_3, ... a_n) and the CCL of each cluster are calculated. The intersection point P(x_1', x_2', ... n_n') of the perpendicular line from (a_1, a_2, a_3, ... a_n) to the CCL is calculated too. Then, they are compared with the end points and the thickness value of each cluster. In this way, a determination is made as to whether this bucket is covered by a cluster or not. If yes, the average frequency of the cluster is used to estimate the selectivity or cardinality of the query and the work is done. If not, processing continues to look at the next cluster in the Clu-Histogram until one is found.

It should be noted that traditionally, when people encounter a query that has predicate on multiple columns of a table at the same time, they usually build one histogram on each involved column separately and then combine the statistics from every histogram once for each query on the fly. Such a traditional approach is inferior when compared with the novel approach presented herein with respect to the presented Clu-Histogram in a number of ways. First, the derived statistics from the combining operation of the traditional approach might not be good enough for data with complex distribution in its n-D hyper-space. Second, traditional approach is inefficient, because, in the traditional approach, for every processed query, the traditional approach needs to combine the single-column histograms once on the fly. Obviously, this repeated computation (in the traditional approach) results in much redundant costs. In addition, maintaining multiple single-column statistics (in the traditional approach) is more expensive than maintaining single multi-column statistics. With multi-column statistics, it also makes more sense to build a multi-column index as needed, because the presented Clu-Histogram makes it easy for a query optimizer to decide if it will use the multi-column index as the data access path or not.

Thus, the Clu-Histogram approach presented herein enables the building of a very high-dimensional histogram, which will generally improve a relational database management system's query optimization and thus improve the overall performance of a query that has predicates on multiple columns of a table at the same time.

As demonstrated herein and above, the production of a novel Clu-Histogram includes two phases. In a clustering phase, a high-resolution equi-width histogram is produced over an n-D domain space, and then a clustering algorithm is processed on all the n-D equi-width histogram buckets that are not the original n-D data set. Once this is done, a group of clusters is acquired and each cluster includes multiple adjacent equi-width histogram buckets that have the similar frequencies. In a representational phase of the CLU-Histogram, each cluster is iterated one by one. For each cluster, a linear regression technique is processed to look for a hyperspace line segment to represent the cluster, and then n-D Euclidean mathematic operations are processed to compute the thickness of the line segment to fully determine the shape, position, and size of the cluster in the n-D space. Then, each cluster is treated as a bucket of the final multidimensional histogram (CLU-Histogram).

Figure 4:
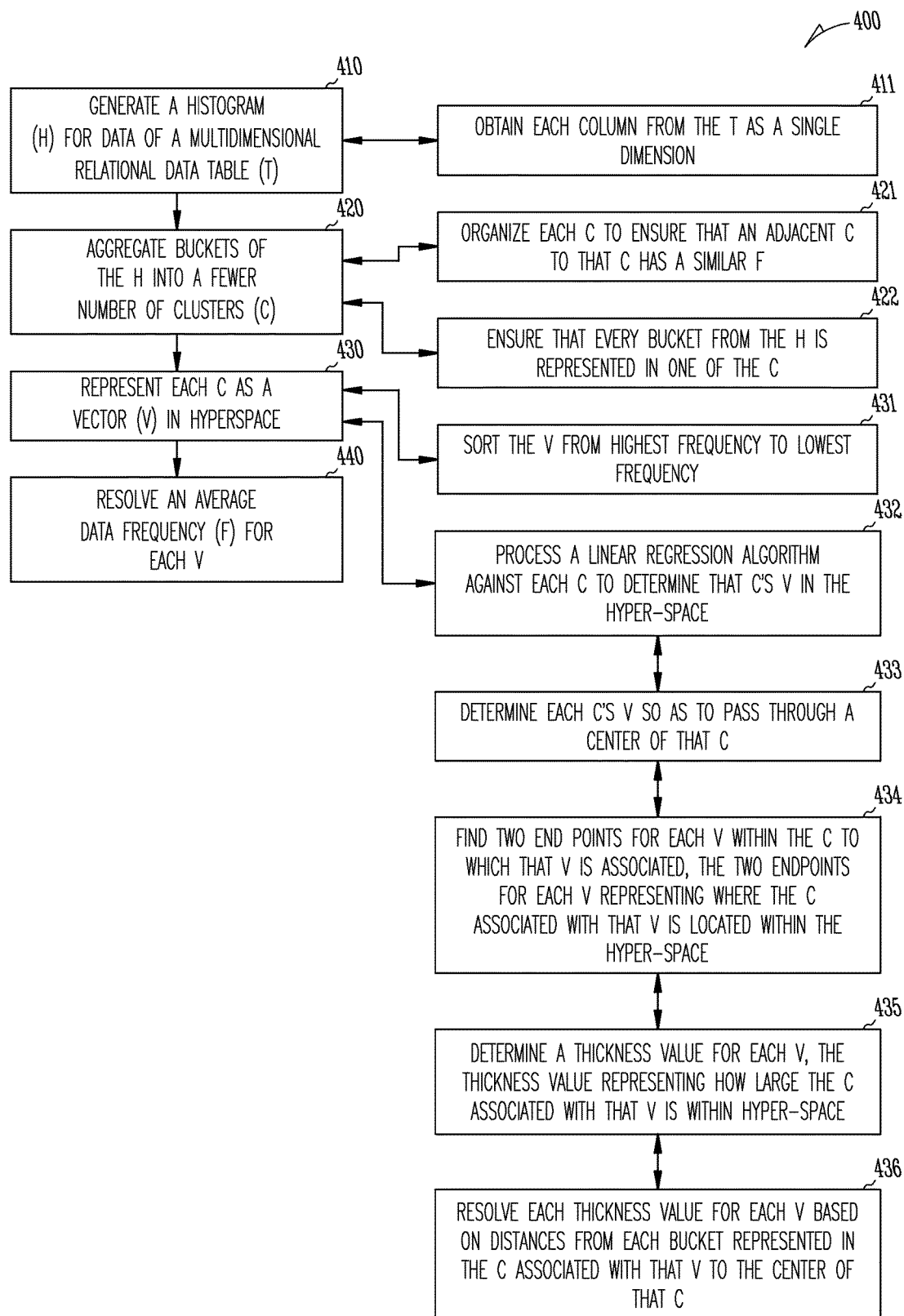
FIG. 4 is a diagram of a method for representing high dimension data for query processing, according to an example embodiment.
Figure 5:
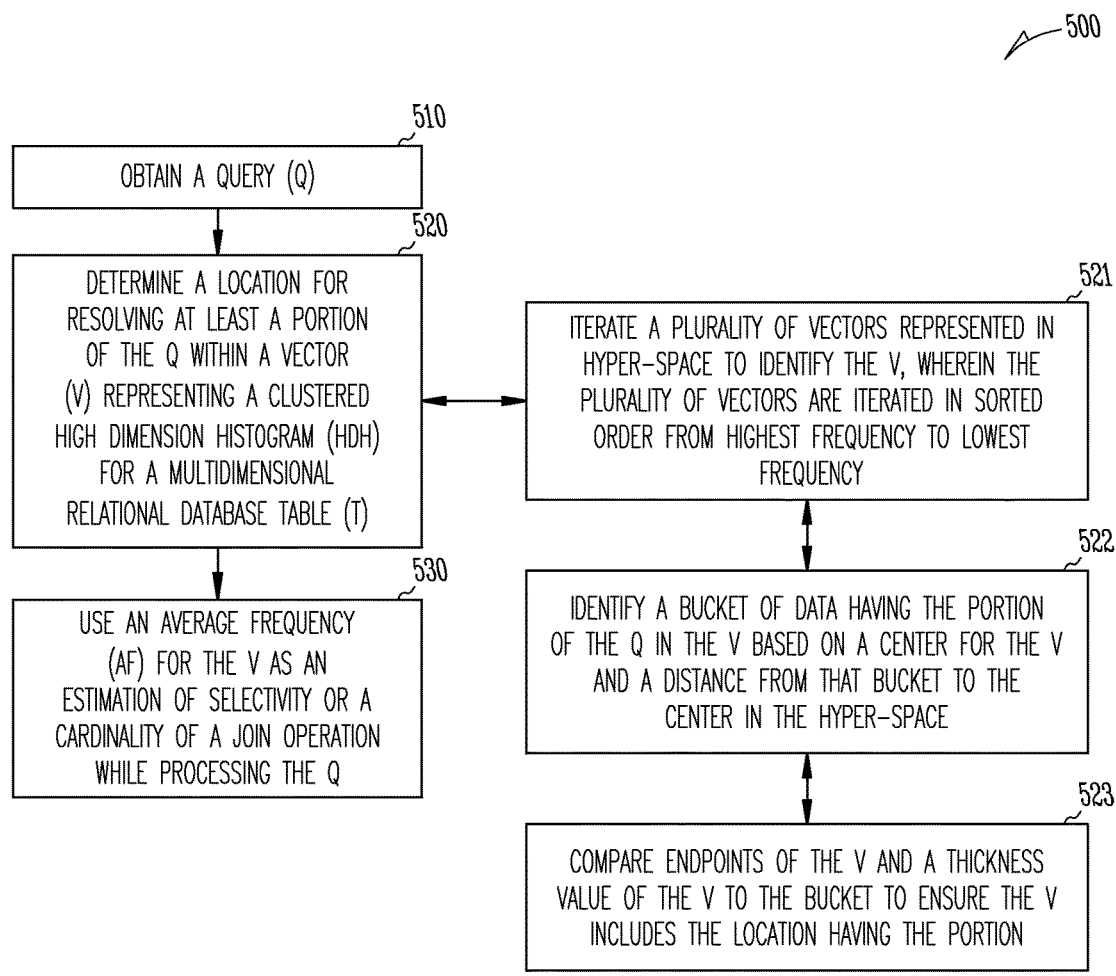
FIG. 5 is a diagram of a method for query processing high dimensional data represented by a CLU-histogram, according to an example embodiment.
Figure 6:
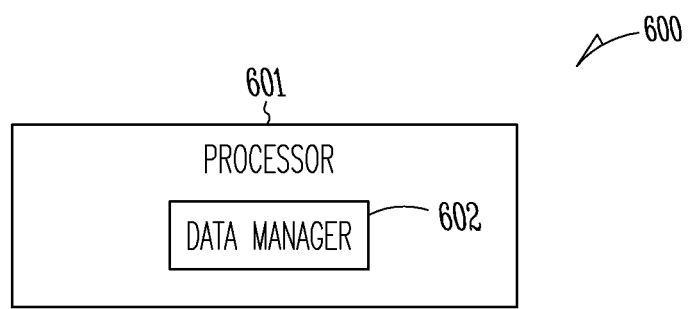
FIG. 6 is a diagram of a query processing system, according to an example embodiment.

These embodiments and other embodiments are presented with the discussion of the FIGS. 4-6.

FIG. 4 is a diagram of a method 400 for representing high dimension data for query processing, according to an example embodiment. The method 400 (hereinafter "high dimensional histogram controller") is implemented as executable instructions that are programmed and reside within memory and/or non-transitory computer-readable storage media for execution on processing nodes (processors) of a network; the network wired, wireless, and/or a combination of wired and wireless.

In an embodiment, the high dimensional histogram controller executes on one or more processors of a relational database system.

In an embodiment, the relational database system is a distributed database system.

At 410, the high dimensional histogram controller generating a histogram for a multi-dimensional relational data table. That is, data is organized into distribution of frequency buckets.

According to an embodiment, at 411, the high dimensional histogram controller obtains each column of the multi-dimensional relational data table as a single unique dimension.

At 420, the high dimensional histogram controller aggregates buckets of the histogram into a fewer number of buckets represented as clusters.

In an embodiment, at 421, the high dimensional histogram controller organizes each cluster to ensure that an adjacent cluster to that cluster has a similar frequency.

In an embodiment, at 422, the high dimensional histogram controller ensures that every bucket from the histogram is represented in one of the clusters.

At 430, the high dimensional histogram controller represents each cluster as a vector in hyper-space. That is all the dimensions (columns) represent hyperspace. When the hyper-space is 2-D the vector is a line segment, when the hyper-space exceeds 2-D it is a vector.

In an embodiment, at 431, the high dimensional histogram controller sorts the vectors from highest frequency to lowest frequency. This ensures that when a query processor is processing a query the most likely vector to be hit is a vector of higher frequency and the vectors are in frequency order for efficiency.

In an embodiment, at 432, the high dimensional histogram controller processes a linear regression algorithm against each cluster to determine that cluster's vector in hyper-space.

In an embodiment of 432 and at 433, the high dimensional histogram controller determines each cluster's vector so as to pass through a center of that cluster.

In an embodiment of 433 and at 434, the high dimensional histogram controller finds two endpoints for each vector within the cluster to which that vector is associated. The two endpoints for each vector representing where the cluster associated with that vector is located within hyper-space.

In an embodiment of 434 and at 435, the high dimensional histogram controller determines a thickness value for each vector, the thickness value representing how large the cluster associated with that vector is within hyper-space.

In an embodiment of 435 and at 436, the high dimensional histogram controller resolves each thickness value for each vector based on distances from each bucket represented in the cluster associated with that vector to the center of that cluster.

FIG. 5 is a diagram of another method 500 for query processing high dimensional data represented by a CLU-histogram, according to an example embodiment. The method 200 (hereinafter "query controller") is implemented as executable instructions within memory and/or non-transitory computer-readable storage media that execute on one or more processors (nodes), the processors specifically configured to dynamic query controller. The dynamic query plan manager is also operational over a network; the network is wired, wireless, or a combination of wired and wireless.

In an embodiment, the query controller processes the CLU-histogram produced by the method 400 of the FIG. 4.

At 510, the query controller obtains a query for processing.

At 520, the query controller determines a location for resolving at least a portion of the query within a vector representing a clustered high dimension histogram for a multi-dimensional relational database table.

According to an embodiment, at 521, the query controller iterates a plurality of vectors represented in hyper-space to identify the vector. The plurality of vectors is iterated in sorted order from highest frequency to lowest frequency.

In an embodiment of 521 and at 522, the query controller identifies a bucket of data having the portion of the query in the vector based on a center for the vector and a distance from that bucket to the center in the hyper-space.

In an embodiment of 522 and at 523, the query controller compares endpoints of the vector and a thickness value of the vector to the bucket to ensure the vector includes the location having the portion.

At 530, the query controller uses an average frequency for the vector as an estimation of selectivity or a cardinality of a join operation while processing the query.

FIG. 6 is a diagram of a query processing system 600, according to an example embodiment. Some components of the query processing system 600 are implemented as executable instructions that are programmed and reside within memory and/or non-transitory computer-readable storage medium that execute on processing nodes of a network. The network is wired, wireless, or a combination of wired and wireless.

In an embodiment, query processing system 600 implements, inter alia, the techniques presented above with the FIGS. 1-3.

In an embodiment, the query processing system 600 implements, inter alia, the techniques presented above with the method 400 of the FIG. 4.

In an embodiment, the query processing system 600 implements, inter alia, the techniques presented above with the method 500 of the FIG. 5.

In an embodiment, the query processing system 600 implements, inter alia, the techniques presented above with the methods of the FIG. 4 and the method 500 of the FIG. 5.

The query processing system 600 includes a processor 601 and a data manager 602.

The processor 601 is part of a relational database system.

The data manager 602 is adapted and configured to: execute on the processor 601, organize a multi-dimensional database table into a clustered high dimension histogram representation that has fewer buckets than a histogram representing the table, each bucket in the clustered high dimension histogram representing a cluster, depicting each cluster of the clustered high dimension histogram as a vector in hyper-space, and providing the vectors to a query processor for processing a query.

In an embodiment, each vector includes two endpoints for identifying a location for that vector in the hyper-space.

In an embodiment of the latter embodiment, each vector includes a thickness value representing how large the vector is in the hyper-space.

In an embodiment, each vector includes an average frequency for that vector accessible to the query processor as an estimation of selectivity or a cardinality of a join operation.

In an embodiment of the latter embodiment, each average frequency is configured to be reduced by the query processor by a fading ratio.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   generating a histogram for data of a multi-dimensional relational data table;
   aggregating buckets of the histogram into a fewer number of buckets that are assigned to clusters and reducing memory space required for housing the buckets when aggregating the buckets;
   representing each cluster as a vector in hyper-space;
   resolving an average data frequency for each vector;
   producing a new histogram based on the vectors and deleting the histogram, wherein producing further includes producing the new histogram from multiple columns of the multi-dimensional relational data table as a single-column histogram with each bucket represented in the single histogram by index values that correspond to dimensions and a total number of rows from the multi-dimensional relational database table that is associated with that bucket; and
   processing, by a processor, a query using the new histogram, the fewer number of buckets, the vector, and the average frequencies against the multi-dimensional relational data table.

2. The method of claim 1, wherein generating further includes obtaining each column from the multi-dimensional relational data table as a single dimension.

3. The method of claim 1, wherein aggregating further includes organizing each cluster to ensure that an adjacent cluster to that cluster has a similar frequency.

4. The method of claim 1, wherein aggregating further includes ensuring that every bucket from the histogram is represented in one of the clusters.

5. The method of claim 1, wherein representing further includes sorting the vectors from highest frequency to lowest frequency.

6. The method of claim 1, wherein representing further includes processing a linear regression algorithm against each cluster to determine that cluster's vector in the hyper-space.

7. The method of claim 6, wherein processing further includes determining each cluster's vector so as to pass through a center of that cluster.

8. The method of claim 7, wherein determining further includes finding two end points for each vector within the cluster to which that vector is associated, the two endpoints for each vector representing where the cluster associated with that vector is located within the hyper-space.

9. The method of claim 8, wherein finding further includes determining a thickness value for each vector, the thickness value representing how large the cluster associated with that vector is within hyper-space.

10. The method of claim 9, wherein determining further includes resolving each thickness value for each vector based on distances from each bucket represented in the cluster associated with that vector to the center of that cluster.

11. A method, comprising:
    obtaining a query;
    determining a location for resolving at least a portion of the query within a vector representing a clustered high dimension histogram for a multi-dimensional relational database table, wherein the clustered high dimension histogram derived from an original histogram that is deleted once the clustered high dimension histogram is produced, and wherein determining further includes deriving a portion of the vector as a bucket from aggregated buckets for the clustered high dimension histogram that is less than an original number of buckets for the clustered high dimension histogram and that requires less memory space than the original number of buckets, wherein the bucket represent a cluster of the clustered high dimension histogram, and accessing the clustered high dimension histogram for multiple columns of the multi-dimensional relational database table as a single histogram with each bucket represented in the single histogram by index values that correspond to dimensions and a total number of rows from the multi-dimensional relational database table that is associated with that bucket;
    using an average frequency for the vector as an estimation of selectivity or a cardinality of a join operation while processing the query; and
    processing the join operation for the query against the multi-dimensional relational database table using the estimation based on the average frequency, the location within the vector, and the clustered high dimension histogram from memory and/or storage.

12. The method of claim 11, wherein determining further includes iterating a plurality of vectors represented in hyper-space to identify the vector, wherein the plurality of vectors are iterated in sorted order from highest frequency to lowest frequency.

13. The method of claim 12, wherein determining further includes identifying bucket data a having the portion of the query in the vector based on a center for the vector and a distance from the bucket to the center in the hyper-space.

14. The method of claim 13, wherein identifying further includes comparing endpoints of the vector and a thickness value of the vector to the bucket to ensure the vector includes the location having the portion.

15. The method of claim 11, wherein using further includes determining whether to use an index to access the location or to scan the database table to access the location based on a value for the estimation of the selectivity.

16. A system, comprising:
a processor; and
a data manager configured to: i) execute on the processor, ii) organize a multi-dimensional database table into a clustered high dimension histogram representation that has fewer number of buckets than histogram buckets generated for a histogram representing the table with the fewer number of buckets requiring less memory space than an original number of buckets, each bucket in the clustered high dimension histogram representing a cluster, and delete the histogram once the clustered high dimension histogram is produced, wherein the clustered high dimension histogram produced from multiple columns of the multi-dimensional database table as a single histogram with each bucket represented in the single histogram by index values that correspond to dimensions and a total number of rows from the multi-dimensional relational database table that is associated with that bucket, iii) depict each cluster of the clustered high dimension histogram as a vector in hyper-space, and iv) process a query using the vectors and the clustered high dimension histogram from memory and/or storage against the multi-dimensional database table.

17. The system of claim 16, wherein each vector includes two endpoints for identifying a location for that vector in the hyper-space.

18. The method of claim 17, wherein each vector includes a thickness value representing how large the vector is in the hyper-space.

19. The method of claim 16, wherein each vector includes an average frequency for that vector accessible to the query processor as an estimation of selectivity or a cardinality of a join operation.

20. The method of claim 19, wherein each average frequency is configured to be reduced by the query processor by a fading ratio.

* * * * *